US010019346B2

(12) United States Patent
Luan et al.

(10) Patent No.: US 10,019,346 B2
(45) Date of Patent: Jul. 10, 2018

(54) GENERATING SOFTWARE TEST SCRIPT FROM VIDEO

(71) Applicants: HEWLETT-PACKARD DEVELOPMENT COMPANY, L.P., Houston, TX (US); Jinfeng Luan, Shanghai (CN); Dror Saaroni, Yehud (IE); Xiaoming Hu, Shanghai (CN)

(72) Inventors: Jin-Feng Luan, Shanghai (CN); Dror Saaroni, Yehud (IL); Xiao-Ming Hu, Shanghai (CN)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 76 days.

(21) Appl. No.: 14/761,534

(22) PCT Filed: Jan. 31, 2013

(86) PCT No.: PCT/CN2013/071200
§ 371 (c)(1),
(2) Date: Jul. 16, 2015

(87) PCT Pub. No.: WO2014/117363
PCT Pub. Date: Aug. 7, 2014

(65) Prior Publication Data
US 2015/0363300 A1      Dec. 17, 2015

(51) Int. Cl.
*G06F 11/00*          (2006.01)
*G06F 11/36*          (2006.01)
(Continued)

(52) U.S. Cl.
CPC ............ *G06F 11/3684* (2013.01); *G06F 3/01* (2013.01); *G06F 11/3688* (2013.01); *G06K 9/00335* (2013.01)

(58) Field of Classification Search
USPC .......................................................... 714/25
See application file for complete search history.

(56) References Cited

U.S. PATENT DOCUMENTS

| | | | | |
|---|---|---|---|---|
| 5,511,185 A | * | 4/1996 | Weinbaum | G06F 11/263 714/38.12 |
| 5,657,438 A | * | 8/1997 | Wygodny | G06F 11/263 714/1 |

(Continued)

FOREIGN PATENT DOCUMENTS

| | | |
|---|---|---|
| CN | 101241466 A | 8/2008 |
| CN | 101526918 A | 9/2009 |

(Continued)

OTHER PUBLICATIONS

Extended European Search Report received in EP Application No. 13873446.2, dated Aug. 9, 2016, 9 pages.
Pham, R. et al., "Beyond Plain Video Recording of GUI Tests: Linking Test Case Instructions with Visual Response Documentation," Proceedings of the 7th International Workshop on Automation of Software Test, IEEE Press, Jun. 2012, pp. 103-109.
Automation Anywhere, "Automated Web Testing in Minutes," retrieved on Nov. 1, 2012, 2 pages, available at http://www.automationanywhere.com/Testing/solutions/automated-web-testing.htm.

(Continued)

*Primary Examiner* — Amine Riad

(57) ABSTRACT

Methods and apparatus are disclosed to generate software test script from video. Example methods disclosed herein include determining a user action in a frame of a video comprising recorded testing of software. The example method also includes identifying an action parameter corresponding to the user action. The example method also includes based on the action parameter, generating without user intervention a script to execute on the software.

20 Claims, 8 Drawing Sheets

(51) Int. Cl.
*G06F 3/01* (2006.01)
*G06K 9/00* (2006.01)

(56) References Cited

U.S. PATENT DOCUMENTS

| | | |
|---|---|---|
| 2009/0077422 A1 | 3/2009 | Khaladkar et al. |
| 2011/0214107 A1 | 9/2011 | Barmeir et al. |
| 2012/0204153 A1 | 8/2012 | Peterson et al. |
| 2012/0218396 A1 | 8/2012 | Benatar |

FOREIGN PATENT DOCUMENTS

| | | |
|---|---|---|
| CN | 101620564 A | 6/2010 |
| CN | 102314386 A | 1/2012 |
| EP | 2246788 A1 | 11/2010 |
| JP | 2010103786 A | 5/2012 |

OTHER PUBLICATIONS

Chang, T-S. et al., "GUI Testing Using Computer Vision," (Research Paper), Proceedings of the 28th international conference on Human factors in computing systems, Apr. 10-15, 2010, pp. 1535-1544.

Hytek Automation, "About IMCS," (Web Page), retrieved on Nov. 1, 2012, 3 pages, available at http://www.hytekautomation.com/Products/IMCS.html.

International Search Report & Written Opinion received in PCT Application No. PCT/CN2013/071200, Nov. 7, 2013, 6 pages.

Technovations, "Load Testing Products," (Web Page), Copyright 1999-2008, retrieved on Nov. 1, 2012, 3 pages, available at http://www.technovations.com/loadtest.htm.

* cited by examiner

```
1    Window("Remote Desktop Connection").InsightObject(■).Click
2    Window("Remote Desktop Connection").InsightObject(┃).Click
3    Window("Remote Desktop Connection").InsightObject(▨).Click
4    Window("Remote Desktop Connection").InsightObject(▨⊗).Click
5    Window("Remote Desktop Connection").WinObject("Text").Type "regedit.exe"
6    Window("Remote Desktop Connection").WinObject("Text").Type micReturn
7    Window("Window").InsightObject(▨ [Edit View Fav 938LF8931E9346912] ).Click        —316
8    Window("Window").InsightObject(▨).Click
9    Window("Google Chrome").InsightObject([#KEY_Ctrl] [▨]).Drag 10,8
10   Window("Google Chrome").InsightObject([#KEY_Ctrl] [▨]).Drop 809,16
11   Window("Google Chrome").WinObject("Text").Type micCtrlDwn + "c" + micCtrlUp
12   Window("Window").InsightObject(🐦).Click
13   Window("Remote Desktop Connection").InsightObject(▨).Click
14   Window("Remote Desktop Connection").WinObject("Text").Type "regg"
15   Window("Remote Desktop Connection").WinObject("Text").Type micBack
16   Window("Remote Desktop Connection").WinObject("Text").Type "edit"
17   Window("Remote Desktop Connection").InsightObject(▨ start  ▨ Library ).Click
18   Window("Remote Desktop Connection").WinObject("Text").Type micReturn
19   Window("Remote Desktop Connection").WinObject("Text").Type micReturn
20   Window("Remote Desktop Connection").WinObject("Text").Type micCtrlDwn + "v" + micCtrlUp
21   Window("Remote Desktop Connection").WinObject("Text").Type micReturn
```

GENERATING SOFTWARE TEST SCRIPT FROM VIDEO

BACKGROUND

Software testing is performed to verify that software performs as it should. The process of software testing includes detecting issues in software, debugging the software, and verifying the issue is fixed. Undesirable issues in software result in abnormal behavior of the software. For example, a shopping application exhibiting abnormal behavior may display incorrect items in a shopping cart when trying to make purchases via the shopping application.

BRIEF DESCRIPTION OF THE DRAWINGS

FIG. 3 illustrates an example portion of test script that may be generated by the example script generating system of FIGS. 1 and 2.

DETAILED DESCRIPTION

Figure 1:
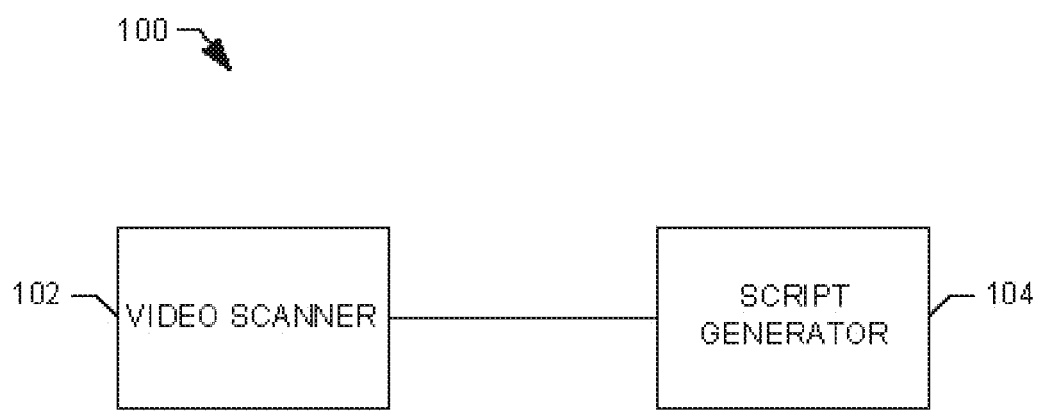
FIG. 1 illustrates an example script generating system implemented in accordance with the teachings of this disclosure.

Software testing involves detecting issues in software that cause the software to behave abnormally. Based on the testing, the software can be debugged to eliminate the issues. Often, detecting issues in software and debugging the software is completed as two separate steps. Quality assurance engineers test software by executing the software (or application or program) and performing one or more user actions on the executing software. After a quality assurance engineer discovers or detects an issue, a software developer attempts to recreate the issue during a debugging process. A software developer is a person that writes software, debugs software, and corrects issues by re-writing software. In a manual debugging process, a software developer identifies user action(s) that led to the discovery of an issue, and repeats the user action(s) to recreate the issue. In an automated debugging process, a user simulation program executes a test script (which may have been manually created by a software developer) to simulate the user actions that previously led to discovery of an issue in an attempt to recreate the issue. In either case, skipping, missing or partially performing one or more operations or user actions may result in not being able to recreate the issue.

Some prior software testing techniques document sequences or orders of user input operations performed during a software testing process by recording (e.g., video recording) a display screen of software and/or recording a quality assurance engineer as the quality assurance engineer tests the software. A software developer is then able to watch the video and identify operations or user actions performed by the quality assurance engineer that led to abnormal software behavior. In some instances, the software developer may then write a test script for the steps to be executed on the software under test by a user simulation program to recreate any discovered issues. That is, a software developer watches the video and then writes down the user actions performed by the quality assurance engineer, and uses the written user actions to either perform manual debugging, or to manually generate a test script to reproduce the discovered issues. Unlike prior systems, examples disclosed herein enable auto-generating test script from a video recording of software under test. That is, the test script is generated without user intervention (e.g., without a software developer watching the video and taking notes of the user actions performed during software testing).

In some prior systems, a software developer manually provides a screenshot (e.g., a video frame) or a portion of the screenshot (e.g., a button), a user action (e.g., a mouse click), and a corresponding action parameter (e.g., coordinates of the mouse click) to image recognition software that generates script executable by a user simulation program to, for example, recreate or simulate the user action. In some prior systems, a software developer uses object recognition software to generate test script executable by a user simulation program. However, in such prior systems, the software developer watches the software test video recording to manually identify relevant screenshots, user actions and action parameters, and manually provides the identified information to the image recognition software. Unlike prior systems, examples disclosed herein enable identifying, without user intervention, information from a video recording for use by image recognition software to generate test script, and providing the information to the image recognition software also without user intervention.

FIG. 1 illustrates an example script generating system 100 that includes an example video scanner 102 and an example script generator 104. In the illustrated example, the video scanner 102 is in communication with the script generator 104. For example, the video scanner 102 may communicate with the script generator 104 via, for example, wired or wireless communications over, for example, a data bus, a Local Area Network (LAN), a wireless network, etc. As used herein, the phrase "in communication," including variants thereof, encompasses direct communication and/or indirect communication through one or more intermediary components. In some examples, the script generator 104 is local to the video scanner 102 and/or integrated therein.

In the illustrated example, the video scanner 102 identifies information in video recordings (e.g., software test videos) of software under test, and provides the information to the script generator 104 to automatically generate test script without manual intervention. In the illustrated example, a video recording of software under test is generated by a quality assurance engineer, and the quality assurance engineer provides the video recording to a software developer after an issue is detected in the software under test. In some examples, the example video scanner 102 analyzes the software test video for an indication of a user action such as a visual indicator indicative of an action performed by a user (e.g., the quality assurance engineer). For example, the video scanner 102 may automatically identify a visual indicator corresponding to a user action (e.g., a mouse click) in the software test video. Example visual indicators may be, for example, a glow, a circle, a square, or other shape or indicia on or around a graphical object subjected to a user action. Example user actions include, for example, mouse actions (e.g., Mouse_Down, Mouse_Up, Mouse_Move, Mouse_Drag, etc.), touchscreen actions, keyboard events, etc.

In examples disclosed herein, video frames in software test videos having visual indicators corresponding to user actions are referred to as marked frames. In the illustrated example, the video scanner 102 captures a marked frame from a software test video, and then captures a non-marked frame that does not include a visual indicator. In some examples, the video scanner 102 captures a portion of the non-marked frame and/or an object displayed in the non-marked frame. In the illustrated example, the non-marked frame represents the user interface of the software under test prior to execution of a user action that is indicated in the marked frame using a visual indicator. The non-marked frame is useful to provide a visual representation of the user interface of the software under test to a user simulation program without obstructions (e.g., without the inserted visual indicators) so that the user simulation program can use image recognition to identify graphical user interface controls (e.g., buttons, text fields, etc.) on which to perform specified user actions. For example, a visual indicator is overlaid on or above a graphical user control of software under test in a video recording after a user action is performed and, therefore, a user simulation program would be unable to match the user interface control of interest (e.g., a graphical control on which to perform a user action) in a marked frame with graphical user interface controls of software under test while executing the software under test. In the illustrated example, the video scanner 102 also identifies a corresponding action parameter corresponding to the user action (e.g., coordinates of a mouse click) from the marked frame.

In some examples, processing the software test video involves the video scanner 102 retrieving and analyzing metadata associated with the software test video. In the illustrated example, the metadata includes information describing user actions. For example, when a user action is performed, metadata such as, for example, a frame reference, an operation and an operation parameter are generated. For example, the operation parameter may describe a mouse action or a keyboard action (e.g., typing). In some examples, keyboard actions may include Keyboard_Input, Key_Up, Key_Down, character codes (e.g., ASCII codes), etc. In some examples, the metadata may be embedded in the software test video. In the illustrated example, the video scanner 102 provides the user action, the user action parameter and the non-marked frame and/or the portion of the non-marked frame in an information package to the script generator 104 for further processing.

In the illustrated example, the script generator 104 generates a test script (e.g., executable code or instructions) based on the information package provided by the video scanner 102. For example, the script generator 104 may generate a test script that is later used by a user simulation program to recreate a user action while executing the software under test during a subsequent automated debugging phase. In some examples, the script generator 104 uses known algorithms such as Image Based Automation (IBA) technology to generate test scripts from the information package. Image Based Automation is software agnostic technology that uses image recognition of objects on a display to perform user actions. However, using other algorithms for generating test scripts is also possible.

Figure 2:
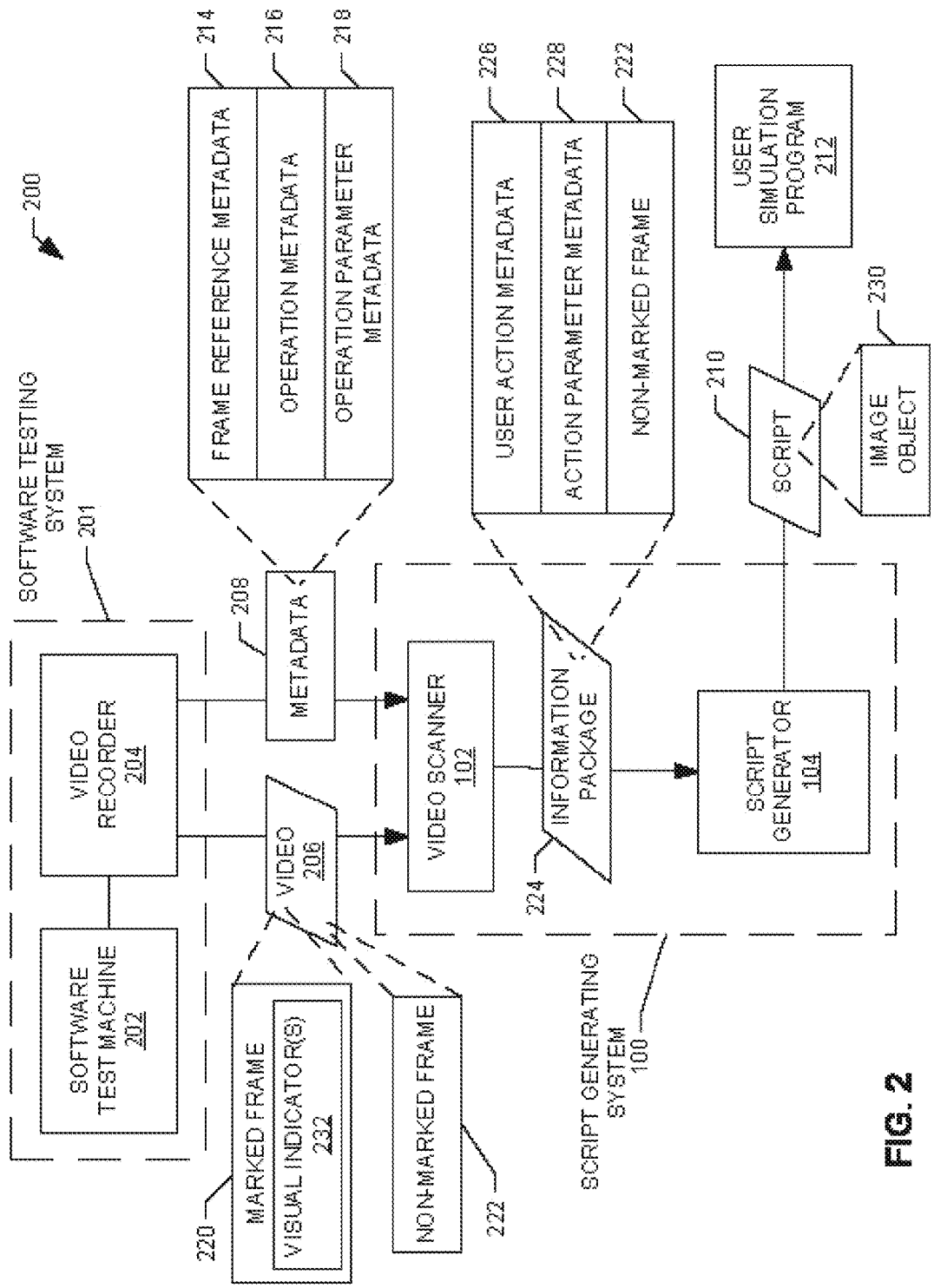
FIG. 2 is an example software testing environment having the script generating system of FIG. 1 to test software.

FIG. 2 is an illustration of an example software testing environment 200 in which examples disclosed herein may be implemented to test software. The example software testing environment 200 of FIG. 2 includes an example software testing system 201, the example script generating system 100 of FIG. 1 and an example user simulation program 212. In the illustrated example, the software testing system 201 is in communication with the script generating system 100, and the script generating system 100 is in communication with the user simulation program 212.

In the illustrated example, the software testing system 201 is used to test software and is provided with an example software test machine 202 and an example video recorder 204. In some examples, the software test machine 202 is a workstation (e.g., a desktop computer, a server, a laptop, etc.) having an input (e.g., a mouse, a keyboard, a haptic interface, etc.) and an output (e.g., a monitor). In some examples, the software test machine 202 is operated by a quality assurance engineer to test software.

In the illustrated example of FIG. 2, the video recorder 204 records video of a display interface (e.g., a graphical user interface (GUI)) of software under test to capture user actions performed by the quality assurance engineer while testing the software. In some examples, the video recorder 204 is a program that runs as a multi-tasked background process and/or a multi-tasked foreground process of the software test machine 202 while software is under test. In some examples, the video recorder 204 begins recording user actions when the quality assurance engineer begins using the software under test. The video recorder 204 of the illustrated example generates an example software test video 206 to record user actions performed by the quality assurance engineer while testing the software.

In some examples, the video recorder 204 superimposes or overlays example visual indicators 232 on a user interface of the software under test captured in the software test video 206 to indicate when and/or where user actions are performed on the user interface of the software under test. For example, when the quality assurance engineer performs a mouse click, the video recorder 204 may superimpose or overlay a colored circle (e.g., a visual indicator 232) at the location on the screen where the quality assurance engineer performed the mouse click. In some examples, different types of visual indicators correspond to different types of user actions. For example, a single-line red circle may represent a single left-button mouse click, a single-line blue circle may represent a single right-button mouse click, a double-line red circle may represent a double left-button mouse click, a green "X" may represent holding the left-mouse button down and dragging the mouse cursor, a red "X" may represent releasing the left-mouse button after dragging the mouse cursor, etc. As a result, the example software test video 206 includes marked frames 220 having the visual indicators 232 and non-marked frames 222 without the visual indicators 232. The marked frames 220 and non-marked frames 222 can be subsequently used by the script generating system 100 to generate test script. For example, when the script generating system 100 detects a single-line red circle in the software test video 206, the script generating system 100 generates a test script to perform a single left-button mouse click on a user interface feature of the software under test indicated by the single-line red circle. Although certain example symbols, shapes and colors are described above as implementing some visual indicators 232 of the illustrated example, other symbols, shapes or colors may additionally or alternatively be used to implement example visual indicators 232 to represent different types of user input. The video recorder 204 of the illustrated example may be configured to superimpose or overlay the different types of visual indicators 232 using any suitable technique such as providing the video recorder 204 a configuration file mapping different user input types to different symbols, shapes and colors (and/or combinations thereof). The different symbols, shapes and colors may be selected based on any suitable criteria including user preferences (e.g., preferences of a quality assurance engineer and/or a software developer), company preferences (e.g., preferences of a company developing software), and/or industry standards (e.g., industry-adopted standards defined for quality assurance processes).

In some examples, the video recorder 204 generates metadata describing performed user actions. For example, the video recorder 204 may generate metadata 208 including example frame reference metadata 214, example operation metadata 216, and/or example operation parameter metadata 218. In some examples, the video recorder 204 stores the metadata 208 generated for a software test video 206 in a data structure such as an operations file or list. In some examples, the video recorder 204 embeds the metadata 208 into the software test video 206. The metadata 208 may be visible to a viewer (e.g., as closed-caption text, codes or text that render on a screen, etc.) or obscured from a viewer (e.g., in a vertical blanking interval of a video frame or encoded into a video frame in a manner that makes the metadata imperceptible to humans but decodable by machines). In the illustrated example of FIG. 2, the frame reference metadata 214 describes or specifies a frame position in the software test video 206 during which the user action is performed. For example, the frame reference metadata 214 may include a frame number and/or a timestamp corresponding to a frame position or time position in the software test video 206. In the illustrated example of FIG. 2, the operation metadata 216 describes or specifies a user input action (e.g., a mouse action, a touchscreen action, or a keyboard action). In the illustrated example, when a user action is detected by the video recorder 204, the video recorder 204 generates the operation parameter metadata 218 including the position or location on the screen of the user action. For example, the video recorder 204 may generate the operation parameter metadata 218 including the coordinates (x, y) of a mouse cursor when a mouse click action occurred. In the illustrated example, when the video recorder 204 detects a keyboard action, the video recorder 204 generates the operation parameter metadata 218 including the keyboard input (e.g., a text character or string) by the user and/or the location on the screen where the input was received.

The example script generating system 100 of FIG. 2 processes the software test video 206, and the metadata 208 (if provided), and generates example test script 210. In the illustrated example, the user simulation program 212 executes the example test script 210 during a software debugging phase to recreate one or more user actions that were performed by, for example, the quality assurance engineer during a software testing phase using the software testing system 201. In some examples, the video scanner 102 processes the software test video 206, and the metadata 208 (if provided), and provides an example information package 224 including information describing the user actions performed in the software test video 206 to the script generator 104. As described below in connection with FIG. 4, the example video scanner 102 aggregates the information included in the example information package 224 differently based on whether example metadata 208 is provided. Regardless of how the information is arranged in the example information package 224, the information package 224 includes an example user action metadata 226, example action parameter metadata 228 and a non-marked frame 222. In the illustrated example, the user action metadata 226 is indicative of the type of user action performed by the user. For example, the user action metadata 226 may include information identifying user action events such as Mouse_Down, Mouse_Up, Mouse_Move, Mouse_Drag, Keyboard_Input, Key_Up, Key_Down, etc. In the illustrated example, the action parameter metadata 228 includes additional information regarding the user action specified in the user action metadata 226. For example, the action parameter metadata 228 may include a text character or string and/or the screen location of a user action (e.g., a mouse click, a touchscreen touch event, etc.) on the screen or graphical user interface of the software under test.

In the illustrated example, the script generator 104 uses the information package 224 to generate test script 210, which is subsequently executed by the user simulation program 212. In some examples, the script generator 104 captures an image object 230 of a user interface feature of the software under test from the software test video 206, and provides the image object 230 in the test script 210. In the illustrated example, a user interface feature captured as the image object 230 is a button, a text field, a scroll control, or another user interface object that is subject to a user action in the software test video 206. In some examples, the user simulation program 212 may not be able to identify the image object 230 that is subject to a user action when a visual indicator (e.g., the visual indicator 232) is superimposed or overlaid on the image object. Thus, in some examples, the script generator 104 detects the image object 230 from a portion of the non-marked frame 222 at a screen location (supplied by the action parameter metadata 228) at which the user action (supplied by the user action metadata 226) was performed. For example, a portion of the non-marked frame 222 may be a button as the image object 230 that is at the screen location at which a mouse click occurred. In some examples, the script generator 104 compiles the generated test script 210 into a data structure. An example data structure that may be compiled by the script generator 104 is described below in connection with FIG. 3. In the illustrated example of FIG. 2, the user simulation program 212 executes the test script 210 received from the script generator 104 on corresponding software that was previously tested using the software testing system 201. In the illustrated example, the user simulation program 212 executes the test script 210 while the software under test is running on the same machine (e.g., computer) executing the user simulation program 212 so that the user simulation program 212 can re-create (e.g., simulate) user actions described in the test script 210 on the software under test. In this manner, the user simulation program 212 can re-create abnormal behavior in the software under test that was observed by the quality assurance engineer when performing the same user actions at the software test machine 202.

The script generating system 100 of the illustrated example eliminates the need for a software developer to be involved in or intervene to analyze the software test video 206 and generate the test script 210. That is, the script generating system 100 can analyze the software test video 206 and generate the test script 210 without user intervention. In some instances, this is useful to provide software developers with more time to dedicate to solving software issues rather than trying to re-create them.

FIG. 3 illustrates an example data structure 300 of test scripts 302 that may be generated by the example script generator 104 of FIGS. 1 and 2 and executed by the example user simulation program 212 of FIG. 2. In the illustrated example, the test scripts 302 include example instruction window descriptors 304, example instruction object descriptors 306 and example instruction event descriptors 308. In the illustrated example, the instruction window descriptor 304 specifies which window or panel of a display on which the user simulation program 212 should focus when executing a user action. For example, when the user simulation program 212 executes a script 310, the user simulation program 212 focuses on an application in which the window title is "Remote Desktop Connection", which may correspond to, for example, the Microsoft remote desktop connection application. In some examples, when the user simulation program 212 executes a script 312, the user simulation program 212 focuses on the "Remote Desktop Connection" window.

In the illustrated example, the user simulation program 212 executes the instruction event descriptor 308 based on the instruction object descriptor 306. For example, when executing the script 310, the user simulation program 212 scans the window corresponding to the "Remote Desktop Connection" user interface for an image object 316 and then "clicks" on the image object 316 in the "Remote Desktop Connection" user interface of the software under test. In the illustrated example, the image object 316 included in the script 310 is the example image object 230 of FIG. 2. In the illustrated example, when executing the script 312, the user simulation program 212 scans the "Remote Desktop Connection" window and inputs the text string "edit" in a text field named "text." Using similar processes, the example user simulation program 212 of FIG. 2 executes each example script 302 of the example data structure 300 of FIG. 3 to recreate software issues that were discovered during a software testing phase using the software testing system 201 of FIG. 2.

Figure 4:
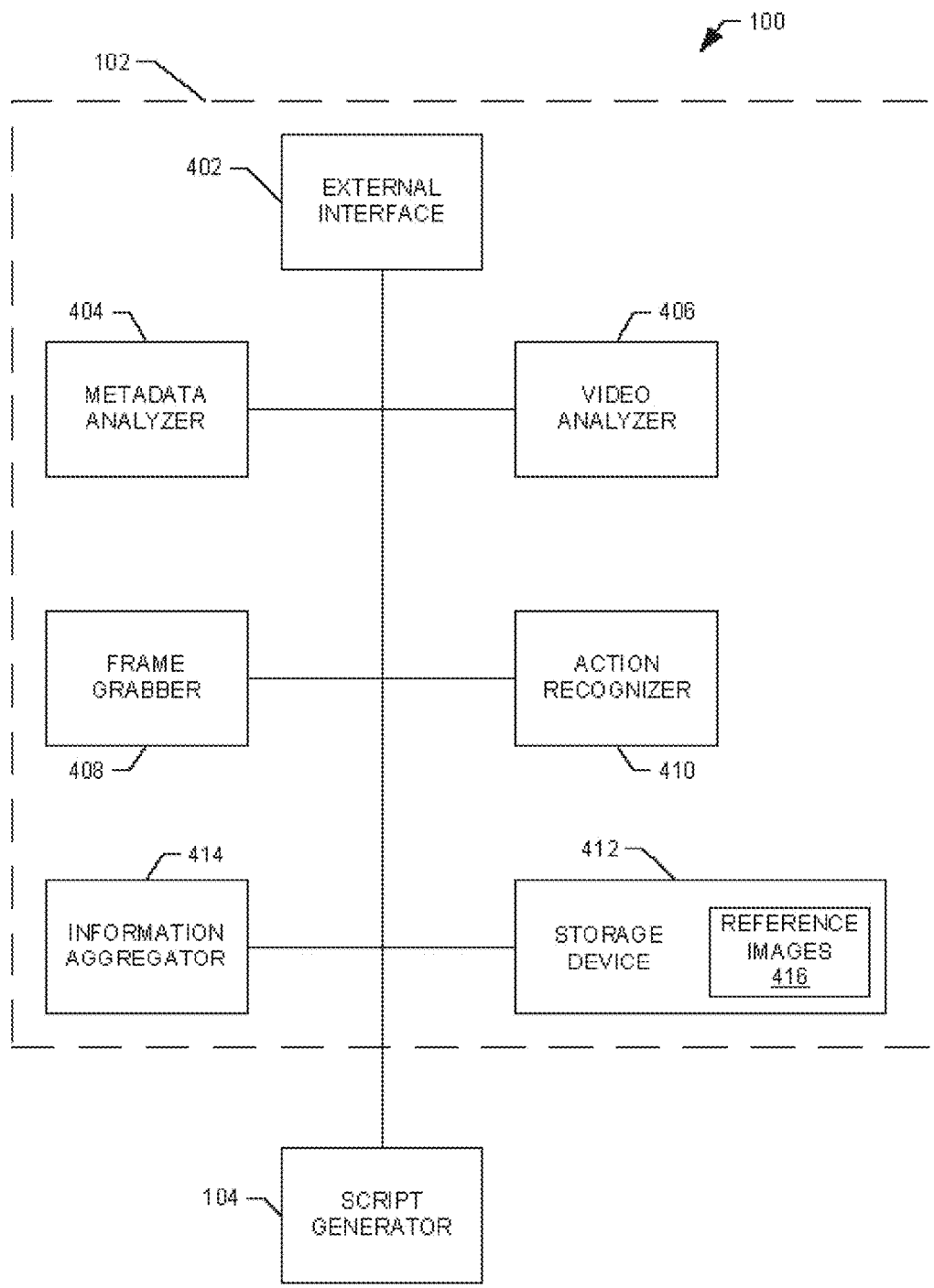
FIG. 4 is a detailed diagram of the example script generating system of FIGS. 1 and 2.

FIG. 4 is a detailed diagram of an example implementation of the example script generating system 100 of FIGS. 1 and 2. In the illustrated example of FIG. 4, the video scanner 102 includes an example external interface 402, an example metadata analyzer 404, an example video analyzer 406, an example frame grabber 408, an example action recognizer 410 and an example information aggregator 414. In the illustrated example, the video scanner 102 also includes an example storage device 412 to store at least a portion of the software test video 206. In the illustrated example, the storage device 412 stores one or more previously analyzed frames from the software test video 206. In the illustrated example, video scanner 102 is in communication with the example script generator 104 via, for example, one or more networks and/or local communication interfaces.

While an example manner of implementing the example script generating system 100 of FIGS. 1 and 2 is illustrated in FIG. 4, one or more of the elements, processes and/or devices illustrated in FIG. 4 may be combined, divided, re-arranged, omitted, eliminated and/or implemented in any other way. Further, the example video scanner 102, the example script generator 104, the example external interface 402, the example metadata analyzer 404, the example video analyzer 406, the example frame grabber 408, the example action recognizer 410, the example storage device 412, the example information aggregator 414 and/or, more generally, the example script generating system 100 of FIG. 4 may be implemented by hardware, software, firmware and/or any combination of hardware, software and/or firmware. Thus, for example, any of the example video scanner 102, the example script generator 104, the example external interface 402, the example metadata analyzer 404, the example video analyzer 406, the example frame grabber 408, the example action recognizer 410, the example storage device 412, the example information aggregator 414 and/or, more generally, the example script generating system 100 of FIG. 4 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example video scanner 102, the example script generator 104, the example external interface 402, the example metadata analyzer 404, the example video analyzer 406, the example frame grabber 408, the example action recognizer 410, the example storage device 412 and/or the example information aggregator 414 are hereby expressly defined to include a tangible computer readable storage device or storage disk such as a memory, DVD, CD, Blu-ray, etc. storing the software and/or firmware. Further still, the example script generating system 100 of FIG. 4 may include one or more elements, processes and/or devices in addition to, or instead of, those illustrated in FIG. 4, and/or may include more than one of any or all of the illustrated elements, processes and devices.

In the illustrated example of FIG. 4, the video scanner 102 is provided with the external interface 402 to exchange communications with, for example, the video recorder 204 (FIG. 2). For example, the external interface 402 receives the software test video 206 (FIG. 2) from the video recorder 204, and provides the software test video 206 to the video analyzer 406 and/or to the storage device 412. In the illustrated example, if the external interface 402 receives metadata 208 (FIG. 2) associated with the software test video 206 from the video recorder 204, the external interface 402 provides the metadata 208 to the metadata analyzer 404.

In the illustrated example of FIG. 4, the metadata analyzer 404 analyzes or parses the metadata 208 received from the external interface 402. In some examples, the metadata 208 may be stored in a data structure such as an operations file or embedded in the software test video 206. In some such examples, the metadata analyzer 404 may analyze the metadata 208 stored in the operations file sequentially. As described above in connection with FIG. 2, the example metadata 208 generated by the example video recorder 204 may include the example frame reference metadata 214, the example operation metadata 216 and the example operation parameter metadata 218. In the illustrated example, the metadata analyzer 404 generates user action metadata 226 (FIG. 2) based on the operation metadata 216. The metadata analyzer 404 of FIG. 4 also generates the action parameter metadata 228 (FIG. 2) based on the operation parameter metadata 218.

In the illustrated example of FIG. 4, the video analyzer 406 analyzes the software test video 206 received from the external interface 402 and identifies a frame (e.g., the example marked frame 220 of FIG. 2) in the software test video 206 including a visual indicator (e.g., the example visual indicator 232 of FIG. 2). In some examples, the video analyzer 406 analyzes the software test video 206 frame-by-frame. In the illustrated example, the video analyzer 406 buffers previously analyzed frames in to the storage device 412. The quantity of buffered frames stored in the storage device 412 can be selected based on user preference or a predetermined quantity. In the illustrated example, when a marked frame (e.g., the marked frame 220) is identified, the video analyzer 406 generates a frame reference using the frame position of the marked frame 220 in the software test video 206. The frame reference generated by the video analyzer 406 may include a frame number and/or a timestamp corresponding to a frame position or time position in the software test video 206.

In the illustrated example of FIG. 4, the frame grabber 408 uses the frame reference metadata 214 received from the metadata analyzer 404 or the frame reference received from the video analyzer 406 to identify a non-marked frame (e.g., the example non-marked frame 222 of FIG. 2). For example, the frame grabber 408 may retrieve a frame from the storage device 412 that is n frame positions prior to the frame position indicated by the frame reference metadata 214. In the illustrated example, the number n frame positions can be selected based on user preference, learned based on historical values, or predetermined. In some examples, the frame grabber 408 scans the retrieved frame to check whether the retrieved frame has the superimposed or overlaid visual indicator 232 included in the marked frame 220. In some such examples, when the retrieved frame has the visual indicator 232, the frame grabber 408 may retrieve a second frame from the storage device 412 that is n frame positions prior to the frame position of the first retrieved frame. In the illustrated example, the frame grabber 408 continues to retrieve frames from the storage device 412 until a non-marked frame (e.g., the non-marked frame 222) is identified.

To identify a user action indicated in a marked frame (e.g., the marked frame 220), the example video scanner 102 is provided with the action recognizer 410. In the illustrated example, the action recognizer 410 receives the marked frame 220 including the superimposed or overlaid visual indicator 232 from the video analyzer 406. The example action recognizer 410 uses the visual indicator 232 superimposed or overlaid in the marked frame 220 to identify the user action. In the illustrated example, the action recognizer 410 compares the visual indicator 232 to example reference images 416 stored in the storage device 412. In the illustrated example, the reference images 416 are stored in a lookup table and map visual indicators to a corresponding user action. For example, a single-line red circle may represent a single left-button mouse click, a single-line blue circle may represent a single right-button mouse click, a double-line red circle may represent a double left-button mouse click, a green "X" may represent holding the left-mouse button down and dragging the mouse cursor, a red "X" may represent releasing the left-mouse button after dragging the mouse cursor, etc. However, other methods to determine which user actions correspond to different visual indicators 232 may additionally or alternatively be used. In the illustrated example, the action recognizer 410 generates the user action metadata 226 based on the user action identified from an analysis of the reference images 416. In some examples, the center of the visual indicator 232 (e.g., a single-line colored circle) corresponds to the coordinates (x, y) of the user action. In some examples, the action recognizer 410 generates the action parameter metadata 228 (e.g., screen position or location of the visual indicator 232 in the marked frame 220, a text character or string, etc.) based on the user action.

In the illustrated example, the information aggregator 414 aggregates information into the information package 224 of FIG. 2 to send to the script generator 104. For example, if the software test video 206 has associated metadata 208, the information aggregator 414 collects the user action metadata 226 and the action parameter metadata 228 from the metadata analyzer 404 and the non-marked frame 222 from the frame grabber 408, and stores the user action metadata 226, the action parameter metadata 228 and the non-marked frame 222 in the information page 224. In some other examples, the information aggregator 414 may collect the user action metadata 226 and the action parameter metadata 228 from the action recognizer 410 and the non-marked frame 222 from the frame grabber 408.

As described above in connection with the example script generating system 100 of FIGS. 1 and 2, the example script generator 104 of FIG. 4 generates test script 210 (FIG. 2) to execute in an example user simulation program 212 (FIG. 2). For example, the script generator 104 may use Image Based Automation technology to generate test script 210 using the information included in the information package 224. In some examples, the script generator 104 identifies an image object (e.g., the example image object 230 of FIG. 2 and/or the example image object 316 of FIG. 3) to include in the test script 210. However, other methods of generating test script from the information included in the example information package 224 for execution by a user simulation program 212 may additionally or alternatively be used.

Figure 5:
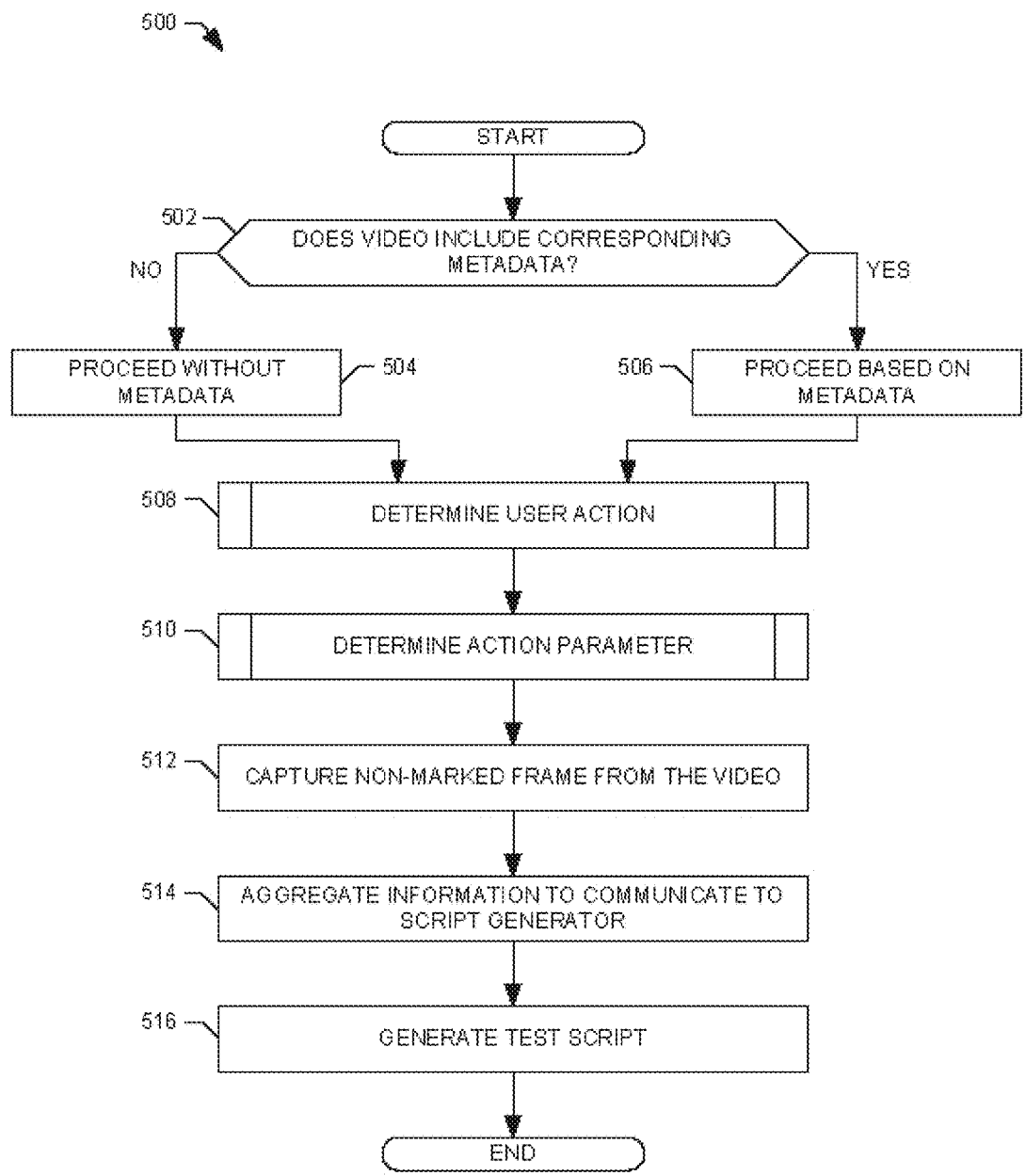
FIG. 5 is a flowchart representative of example machine readable instructions that may be executed to generate test script.
Figure 6:
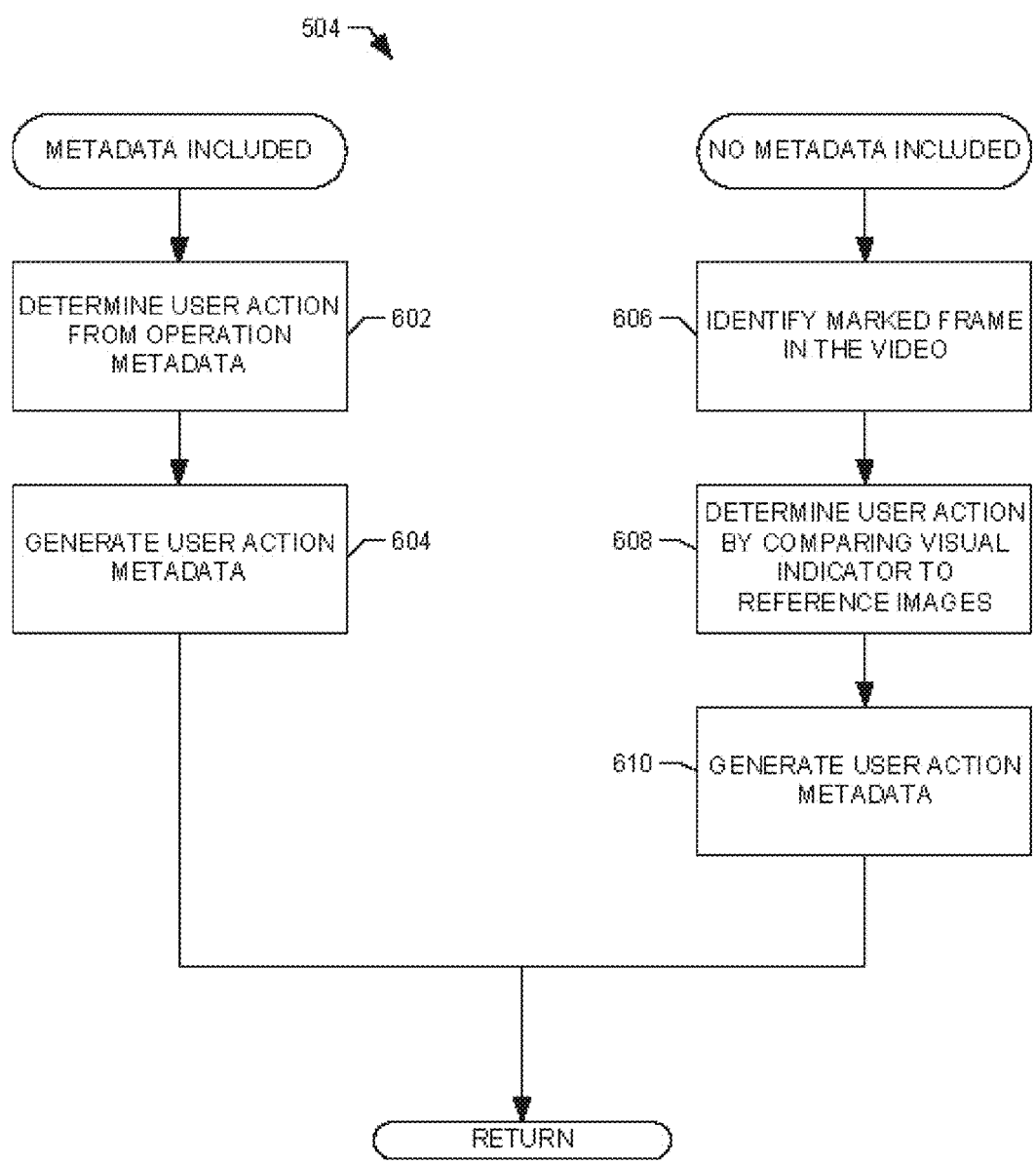
FIG. 6 is a flowchart representative of example machine readable instructions that may be executed to determine a user action.
Figure 7:
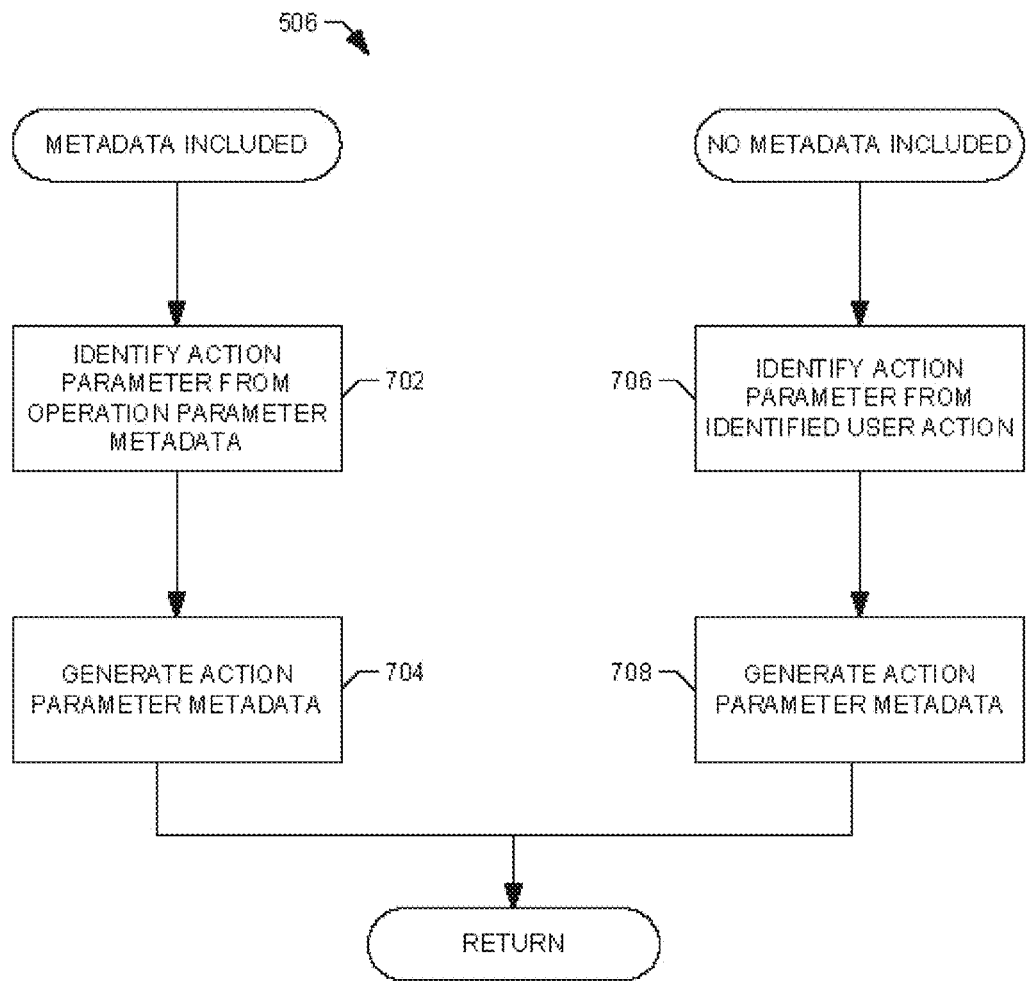
FIG. 7 is a flowchart representative of example machine readable instructions that may be executed to identify an input parameter.

Flowcharts representative of example machine readable instructions for implementing the script generating system 100 of FIGS. 1, 2 and 4 are shown in FIGS. 5-7. In these examples, the machine readable instructions comprise programs for execution by a processor such as the processor 812 shown in the example processing platform 800 discussed below in connection with FIG. 8. The programs may be embodied in software stored on a tangible computer readable medium such as a CD-ROM, a floppy disk, a hard drive, a digital versatile disk (DVD), a Blu-ray disk, or a memory associated with the processor 812, but the programs in their entirety and/or parts thereof could alternatively be executed by a device other than the processor 812 and/or embodied in firmware or dedicated hardware. Further, although the example programs are described with reference to the flowcharts illustrated in FIGS. 5-7, many other methods of implementing the script generating system of FIGS. 1, 2 and 4 may alternatively be used. For example, the order of execution of the blocks may be changed, and/or some of the blocks described may be changed, eliminated, or combined.

The example processes of FIGS. 5-7 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 5-7 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable storage device or storage disk and to exclude propagating signals. As used herein, when the phrase "at least" is used as the transition term in a preamble of a claim, it is open-ended in the same manner as the term "comprising" is open ended.

The program of FIG. 5 begins at block 502 at which the example external interface 402 (FIG. 4) determines whether the test video 206 (FIG. 2) of software under test includes corresponding metadata 208 (FIG. 2). For example, the external interface 402 receives the example software test video 206 (FIG. 2) from the video recorder 204 (FIG. 2), and analyzes the example software test video 206 for the corresponding metadata 208. If the metadata 208 is not provided by the video recorder 204, the process of FIG. 5 proceeds without the metadata 208 (block 504). Otherwise, if the external interface 402 identifies the metadata 208 from the video recorder 204, the process of FIG. 5 proceeds with the metadata 208 (block 506).

At block 508, the video scanner 102 determines a user action. For example, the metadata analyzer 404 (FIG. 4) or the action recognizer 410 (FIG. 4) may determine a user action as described below in connection with FIG. 6.

At block 510, the video scanner 102 determines an action parameter corresponding to the user action. For example, the metadata analyzer 404 or the action recognizer 410 determines an action parameter as described below in connection with FIG. 7.

At block 512, the video scanner 102 captures a non-marked frame (e.g., the non-marked frame 222) from the software test video 206 that does not include the visual indicator 232. For example, the frame grabber 408 (FIG. 4) uses the frame reference metadata 214 received from the metadata analyzer 404 and/or the frame reference received from the video analyzer 406 to retrieve a frame from the storage device 412. In some examples, the frame grabber 408 scans the retrieved frame for the visual indicator 232 and may retrieve additional frame(s) from the storage device 412 until it retrieves a non-marked frame 222 without a visual indicator 232. In the illustrated example, when the frame grabber 408 identifies a non-marked frame 222, the frame grabber 408 communicates the non-marked frame 222 to the information aggregator 414 (FIG. 4).

At block 514, the video scanner 102 aggregates information to provide to the script generator 104 to generate the test script 210 (FIG. 2). For example, the information aggregator 414 collects the user action metadata 226 and the action parameter metadata 228 provided by the metadata analyzer 404 and/or the action recognizer 410 and the non-marked frame 222 from the frame grabber 408. The information aggregator 414 then communicates the collected information to the script generator 104 in an information package 224. At block 516, the script generator 104 generates the test script 210 based on the information package 224, and the example process 500 ends.

The program of FIG. 6 illustrates an example method of determining a user action. The example process of FIG. 6 may be used to implement block 508 of FIG. 5. When the software test video 206 has associated metadata 208 provided by the video recorder 204 (FIG. 2), the metadata analyzer 404 (FIG. 4) determines a user action based on the operation metadata 216 of FIG. 2 (block 602). For example, the metadata analyzer 404 analyzes the metadata 208 received via the external interface 402 and identifies the operation metadata 216. The example metadata analyzer 404 uses the operation metadata 216 to identify a user action and generate the user action metadata 226 to describe the user action (block 604). Control then returns to a calling function or process such as the example program 500 of FIG. 5 and the example process of FIG. 6 ends.

When the video recorder 204 does not provide the metadata 208, the video scanner 102 identifies a marked frame 220 in the software test video 206 (block 606). For example, the video analyzer 406 analyzes the software test video 206 frame-by-frame until it finds a visual indicator 232 in a frame (e.g., the marked frame 220). In the illustrated example, the video analyzer 406 communicates the marked frame 220 to the action recognizer 410.

At block 608, the video scanner 102 determines the user action based on the visual indicator 232 superimposed or overlaid on the user interface in the marked frame 220 by, for example, using the action recognizer 410 to compare the visual indicator 232 to the reference images 416 stored in the storage device 412. In this manner, the action recognizer 410 identifies a user action corresponding to a reference image 416 that matches the visual indicator 232. The example action recognizer 410 uses the identified user action to generate the user action metadata 226 (block 610). Control then returns to a calling function or process such as the example program 500 of FIG. 5, and the example process of FIG. 6 ends.

The program of FIG. 7 illustrates an example method of identifying a user parameter. The example process of FIG. 7 may be used to implement block 510 of FIG. 5. When the software test video 206 has associated metadata 208 provided by the video recorder 204 (FIG. 2), the metadata analyzer 404 analyzes the metadata 208 received via the external interface 402 and identifies the operation parameter metadata 218 (block 702). In the illustrated example, the example metadata analyzer 404 uses the operation parameter metadata 218 to generate the action parameter metadata 228 (e.g., a text character or string, a keyboard input, coordinates of a user action, etc.) (block 704). Control then returns to a calling function or process such as the example program 500 of FIG. 5, and the example process of FIG. 7 ends.

When the video recorder 204 does not provide the metadata 208, the video scanner 102 identifies the action parameter from an identified user action (block 706). For example, the action recognizer 410 identifies the action parameter based on a user action (e.g., screen position or location of the visual indicator 232, a text character or string, etc.) identified at block 606 of FIG. 6 in the marked frame 220 received from the video analyzer 406. The action recognizer 410 generates the action parameter metadata 228 using the action parameter (block 708). Control then returns to a calling function or process such as the example program 500 of FIG. 5, and the example process of FIG. 7 ends.

Figure 8:
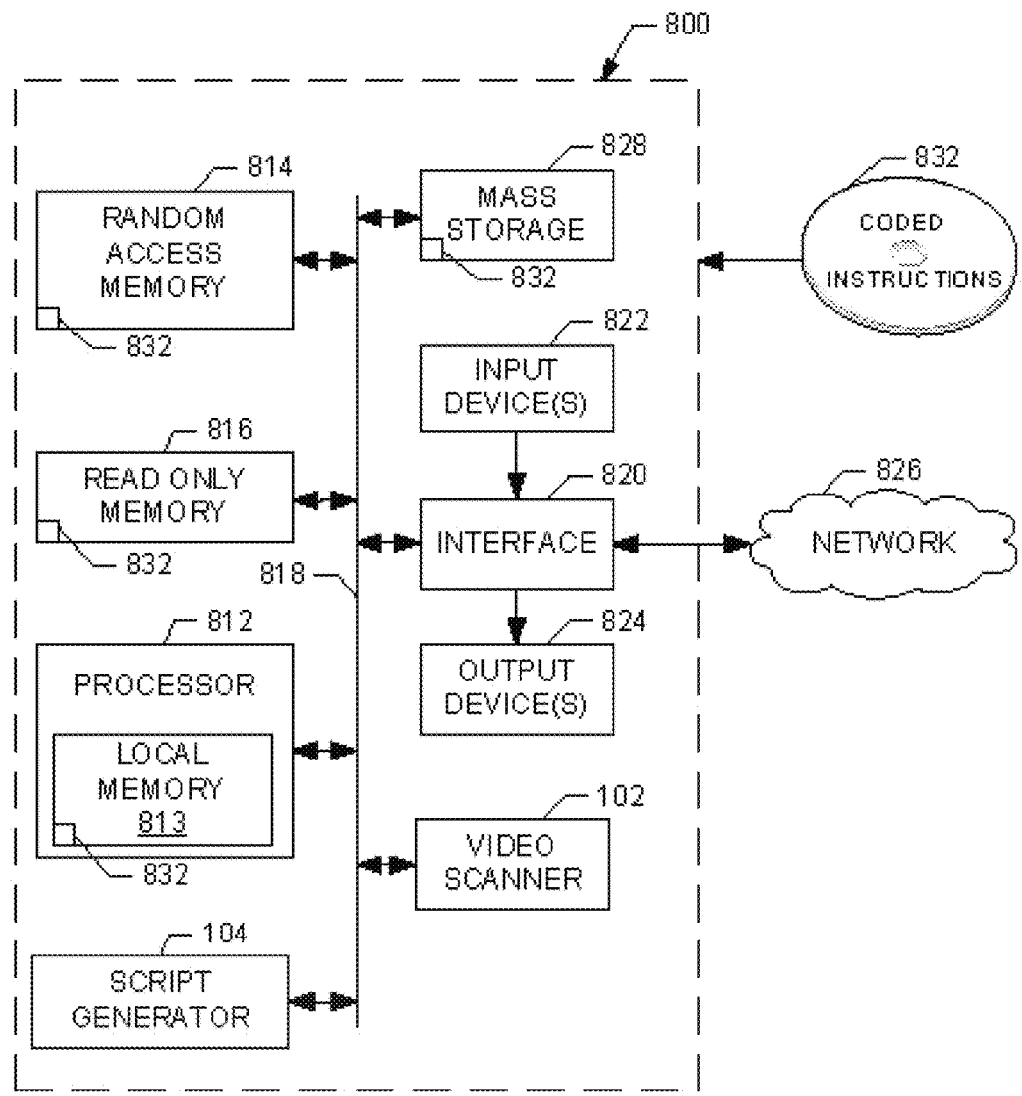
FIG. 8 is a block diagram of an example processing platform capable of executing the example machine readable instructions of FIGS. 5, 6 and/or 7 to implement the example script generating system of FIGS. 1, 2 and/or 4.

FIG. 8 is a block diagram of an example processing platform 800 capable of executing the instructions of FIGS. 5-7 to implement the script generating system 100 of FIGS. 1, 2 and 4. The processing platform 800 can be, for example, a server, a personal computer, an Internet appliance, or any other type of computing device.

The processing platform 800 of the instant example includes a processor 812. For example, the processor 812 can be implemented by one or more microprocessors or controllers from any desired family or manufacturer.

The processor 812 includes a local memory 813 (e.g., a cache) and is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

In the illustrated example, the processing platform 800 also includes a video scanner 102 and a script generator 104. Although the video scanner 102 and the script generator 104 are shown as separate components, the video scanner 102 and/or the script generator 104 may be implemented by one or more of the other components of the processing platform 800.

The processing platform 800 also includes an interface circuit 820. The interface circuit 820 may be implemented by any type of interface standard, such as an Ethernet interface, a universal serial bus (USB), and/or a PCI express interface.

One or more input devices 822 are connected to the interface circuit 820. The input device(s) 822 permit a user to enter data and commands into the processor 812. The input device(s) can be implemented by, for example, a keyboard, a mouse, a touchscreen, a track-pad, a trackball, isopoint and/or a voice recognition system.

One or more output devices 824 are also connected to the interface circuit 820. The output devices 824 can be implemented, for example, by display devices (e.g., a liquid crystal display, a cathode ray tube display (CRT), a printer and/or speakers). The interface circuit 820, thus, typically includes a graphics driver card.

The interface circuit 820 also includes a communication device such as a modem or network interface card to facilitate exchange of data with external computers via a network 826 (e.g., an Ethernet connection, a digital subscriber line (DSL), a telephone line, coaxial cable, a cellular telephone system, etc.).

The processing platform 800 also includes one or more mass storage devices 828 for storing software and data. Examples of such mass storage devices 828 include floppy disk drives, hard drive disks, compact disk drives and digital versatile disk (DVD) drives. The mass storage device 828 may implement a local storage device.

Coded instructions 832 representative of the machine readable instructions of FIGS. 5-7 may be stored in the mass storage device 828, in the volatile memory 814, in the non-volatile memory 816, and/or on a removable storage disc such as a CD or DVD.

From the foregoing, it will be appreciated that example methods, apparatus and articles of manufacture disclosed herein increase the efficiency of testing and debugging software by generating test script from video without user intervention rather than needing a person to generate test script by watching the video and manually documenting steps required to re-create a problematic issue in software under test.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method of generating a script comprising:
    scanning, by a processor, a video to find a user action that was performed on a screen during execution of an application and recorded in the video, including analyzing the video, by the processor, frame by frame until a visual indicator is identified in a marked frame of the video, wherein the visual indicator is a graphical item that was superimposed onto the marked frame of the video to mark a location on the screen where the user action was performed, and a graphic of the visual indicator represents a specific type of user action that was performed;
    determining, by the processor, the user action captured in the marked frame of the video by mapping the visual indicator identified in the marked frame to the specific type of user action in a lookup table;
    generating, by the processor, an action parameter corresponding to the determined user action;
    based on the action parameter, generating, by the processor, a test script to execute on software under test; and
    executing, by the processor, the test script to recreate the user action captured in the video during execution of the software under test.

2. A method as defined in claim 1, wherein determining the user action captured in the marked frame comprises:
    comparing the visual indicator in the marked frame to the plurality of reference images of visual indicators to identify one of the plurality of reference images of visual indicators that matches the visual indicator, and
    mapping the matched reference image of visual indicator to the specific type of user action in the lookup table that maps the plurality of reference images of visual indicators to corresponding user actions.

3. A method as defined in claim 2, wherein, in the lookup table, different graphics of visual indicators correspond to different types of user actions, including a mouse click and a touchscreen touch element.

4. A method as defined in claim 1, further comprising:
    identifying a non-marked frame of the video that does not include the visual indicator, wherein the non-marked frame is displayed prior to the marked frame in the video; and
    capturing a portion of the non-marked frame,
    wherein generating the test script is based on the user action, the action parameter and the portion of the non-marked frame.

5. A method as described in claim 1 wherein determining the user action further comprises analyzing a data structure of user actions recorded in the video.

6. A method as described in claim 1 wherein the action parameter includes the location of the visual indicator in the marked frame, the location of the visual indicator indicating a screen position of the user action.

7. A method as described in claim 1 wherein the action parameter includes a text string.

8. A method as described in claim 1 wherein generating the action parameter further comprises analyzing user actions recorded in the video.

9. An apparatus to generate a script comprising:
    a processor; and
    a memory storing instructions that when executed by the processor cause the processor to:
    scan a video to find a user action performed on a screen during execution of an application and recorded in the video, including analyzing the video frame by frame until a visual indicator is identified in a marked frame of the video, wherein the visual indicator is a graphical item that was superimposed onto the marked frame of the video to mark a location on the screen where the user action was performed, and a graphic of the visual indicator represents a specific type of user action that was performed;

determine the user action captured in the marked frame of the video by mapping the visual indicator identified in the marked frame to the specific type of user action in a lookup table;

generate an action parameter corresponding to the determined user action;

based on the action parameter, generate a test script to execute on software under test; and execute the test script to recreate the user action captured in the video during execution of the software under test.

10. The apparatus as defined in claim 9, wherein, to determine the user action captured in the marked frame, the instructions are to cause the processor to:

compare the visual indicator in the marked frame to the plurality of reference images of visual indicators to identify one of the plurality of reference images of visual indicators that matches the visual indicator in the marked frame, and map the matched reference image of visual indicator to the specific type of user action in the lookup table that maps the plurality of reference images of visual indicators to corresponding user actions.

11. The apparatus as defined in claim 9, wherein the instructions are to cause the processor to:

identify a non-marked frame in the video that does not include the visual indicator; and capture a portion of the non-marked frame, wherein the processor is to generate the test script based on the action parameter and the portion of the non-marked frame.

12. The apparatus as defined in claim 9, wherein to generate the action parameter corresponding to the determined user action, the instructions are to cause the processor to identify the location of the visual indicator in the marked frame, the location of the visual indicator indicating where the user action was performed.

13. A tangible non-transitory computer readable storage medium comprising instructions that, when executed, cause a machine to:

scan a video to find a user action performed on a screen during execution of an application and recorded in the video, including analyzing the video frame by frame until a visual indicator is identified in a marked frame of the video, wherein the visual indicator is a graphical item that was superimposed onto the marked frame of the video to mark a location on the screen where the user action was performed, and a graphic of the visual indicator represents a specific type of user action that was performed;

determine the user action captured in the marked frame of the video by mapping the visual indicator identified in the marked frame to the specific type of user action in a lookup table;

generate an action parameter corresponding to the user action;

based on the action parameter, generate a test script to execute on software under test; and execute the test script to recreate the user action captured in the video during execution of the software under test.

14. The tangible non-transitory computer readable storage medium according to claim 13, wherein the instructions further cause the machine to identify a non-marked frame that does not include the visual indicator, wherein the machine is to generate the test script based on the action parameter and the non-marked frame.

15. The tangible non-transitory computer readable storage medium according to claim 13, wherein, to determine the user action captured in the marked frame, the instructions cause the machine to:

compare the visual indicator in the marked frame to the plurality of reference image of visual indicators to identify one of the plurality of reference images of visual indicators that matches the visual indicator in the marked frame, and map the matched reference image of visual indicator to the specific type of user action in the lookup table that maps the plurality of reference images of visual indicators to corresponding user actions.

16. The method as defined in claim 1, wherein generating the test script includes generating the test script without user intervention.

17. The apparatus as defined in claim 9, wherein, to generate the test script, the instructions are to cause the processor to generate the test script without user intervention.

18. The tangible non-transitory computer readable storage medium according to claim 13, wherein, to generate the test script, the instructions are to cause the machine to generate the test script without user intervention.

19. The method as defined in claim 1, wherein, prior to analyzing the video, the method comprises:

marking frames of the software under test that received user actions, including superimposing visual indicators corresponding to the user actions onto the frames at locations of the frames where the user actions were performed, wherein different visual indicators are used for different types of user actions; and generating the video to be analyzed, wherein the video includes the marked frames that have the visual indicators and non-marked frames that do not have the visual indicators.

20. The tangible non-transitory computer readable storage medium according to claim 13, wherein, prior to analyzing the video, the instructions are to cause the machine to:

mark frames of the software under test that received user actions, including superimposing visual indicators corresponding to the user actions onto the frames at locations of the frames where the user actions were performed, wherein different visual indicators are used for different types of user actions; and generate the video to be analyzed, wherein the video includes the marked frames that have the visual indicators and non-marked frames that do not have the visual indicators.

* * * * *